Jan. 24, 1967

G. X. LENS ETAL 3,300,026

TRANSPORTING DEVICE

Filed Jan. 25, 1965

Inventors
GEORGES X. LENS
JOSEPHUS E. F. VANHENTENRIJK
CONSTANT L. DE MOL
By Philip M. Bolton
Attorney

Jan. 24, 1967   G. X. LENS ETAL   3,300,026
TRANSPORTING DEVICE

Filed Jan. 25, 1965   8 Sheets-Sheet 8

Inventors
GEORGES X. LENS
JOSEPHUS E. F. VANHENTENRIJK
CONSTANT L. DE MOL
By Philip M. Bolton
Attorney

United States Patent Office 3,300,026
Patented Jan. 24, 1967

3,300,026
TRANSPORTING DEVICE
Georges Xavier Lens, Evere, Josephus Evaristus Firminus Vanhentenrijk, Mortsel, and Constant Lodewijk De Mol, Wilrijk, Belgium, assignors to International Standard Electric Corporation, New York, N.Y., a corporation of Delaware
Filed Jan. 25, 1965, Ser. No. 428,177
8 Claims. (Cl. 198—143)

The present invention relates to a transporting device for letters and similar flat objects, more particularly for a letter sorting machine, said transporting device comprising an endless conveyor which is constituted by a pair of parallel endless belts or chains having at least one straight portion and at least one curved portion, a plurality of letter holders being arranged between said pair of parallel endless belts or chains and being each secured thereto by a shaft which is rotatably mounted in two opposite points of said belts or chains, a lever arm being rigidly secured at one end to one end of said shaft and being guided at its other end by guiding means mounted in a plane parallel to the planes of said endless chains or belts and ensuring that the associated letter holder maintains its position in space.

Such a transporting device is already known from the Dutch Patent No. 81,125 (G. X. LENS 56) wherein said guiding means is constituted by a third chain which is driven by auxiliary driving means.

It is an object of the present invention to provide a transporting device of the type mentioned above and which does not require such auxiliary driving means and hence no space for mounting these driving means.

The present transporting device is characterized in that said guiding means include a first straight guide and a second straight guide which are parallel to said straight portion of said pair of chains or belts, that said lever arm carries at said other end roller means which are freely rotatable about an axle parallel to said shaft and which are guided between said first and second straight guides and that said guiding means further include a curved guide and a freely rotatable element having indentations in one of which said roller means are engaged when they leave said straight portion, said curved guide preventing said roller means to be disengaged out of an indentation while being carried by said rotatable element.

It is another object of the present invention to provide a holder for letters and similar flat objects. This holder is characterized in that it comprises at least one compartment the bottom of which may be opened when said holder is displaced along tripping means in the one and other direction.

Still another object of the present invention is to provide a letter bin constituted by a casing. This letter bin is characterized in that said casing is divided in two compartments 100, 101 by a separation wall 104 which carries at its top a pivot axle 103 for a two-position movable deflector plate 102 displaceable by control means and which closes said first and second compartments when it is in a first and second position respectively.

The above mentioned and other objects and features of the invention will become more apparent and the invention itself will be best understood by referring to the following description of an embodiment taken in conjunction with the accompanying drawings wherein:

Before describing the present transporting device the following should be noted. As described in the copending Dutch patent application of even date and entitled: "Transfer Mechanism" (J. Van Hertenrijk, E. Dillow, and F. Lenssen) the destination of each letter processed is coded and each letter is then automatically inserted in a compartment of a letter holder at a position located above the main conveyor of the letter sorting machine. Each letter conveyed in a letter holder of the main conveyor is transferred to the letter bin allocated to its destination under the control of the code of this destination which has been keyed by the operator. This transfer operation may for instance be performed in the manner described in the Belgian Patent No. 507,878 (G. X. LENS 54). In the letter sorter disclosed therein, a control electromagnet associated to the letter bin allocated to the destination of the letter is operated at the moment the letter holder, wherein the letter is enclosed, passes above this letter bin. This electromagnet then opens the letter holder so that the letter enclosed therein drops in the letter bin.

Figure 1:
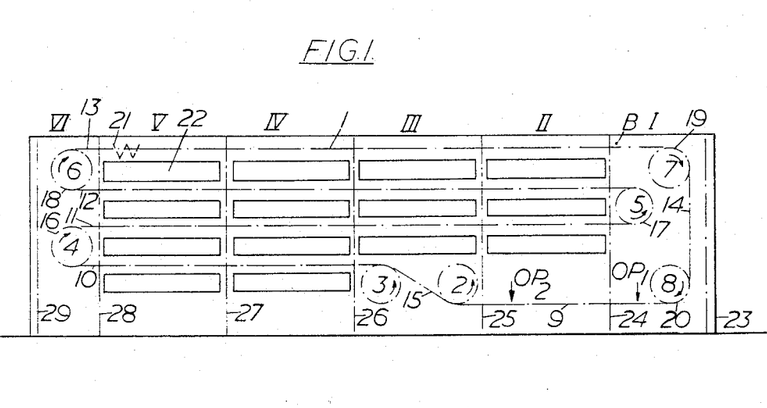
FIG. 1 is a schematic view of an endless conveyor forming part of a transporting device according to the invention.
Figure 2:
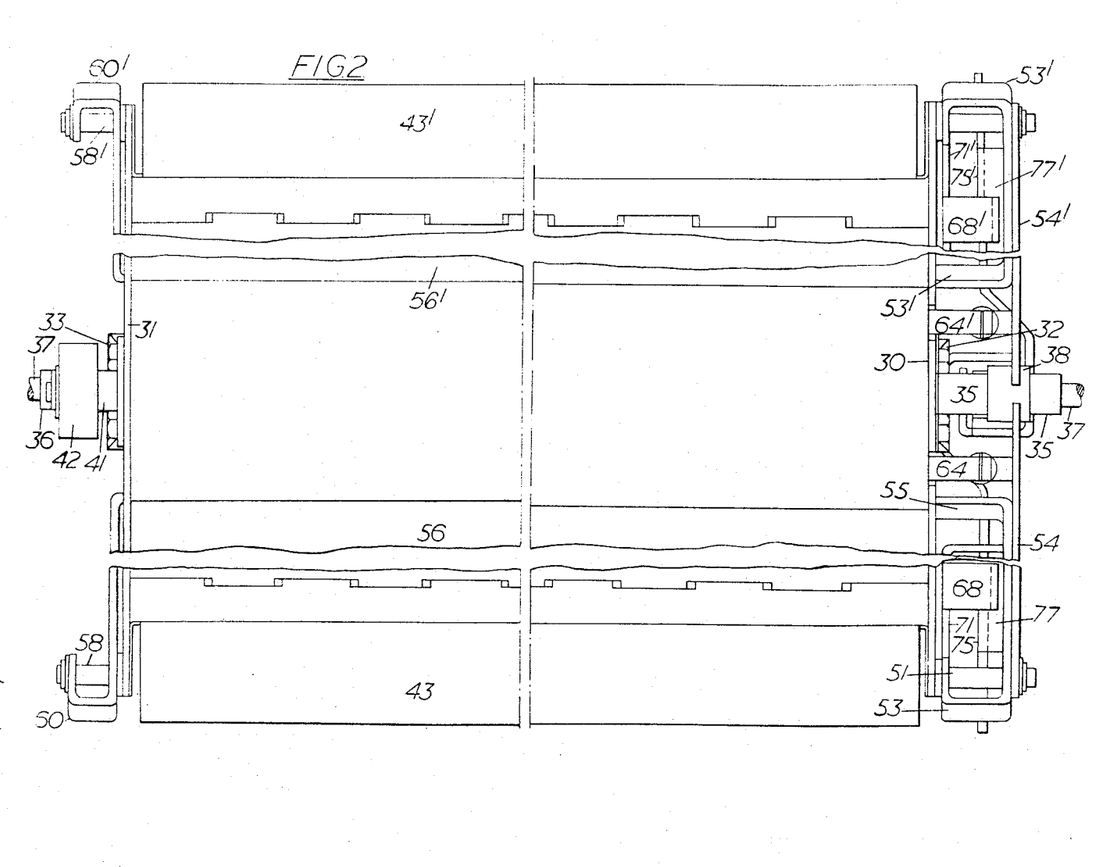
FIG. 2 is a top view of a letter holder carried by the endless conveyor of FIG. 1.
Figure 3:
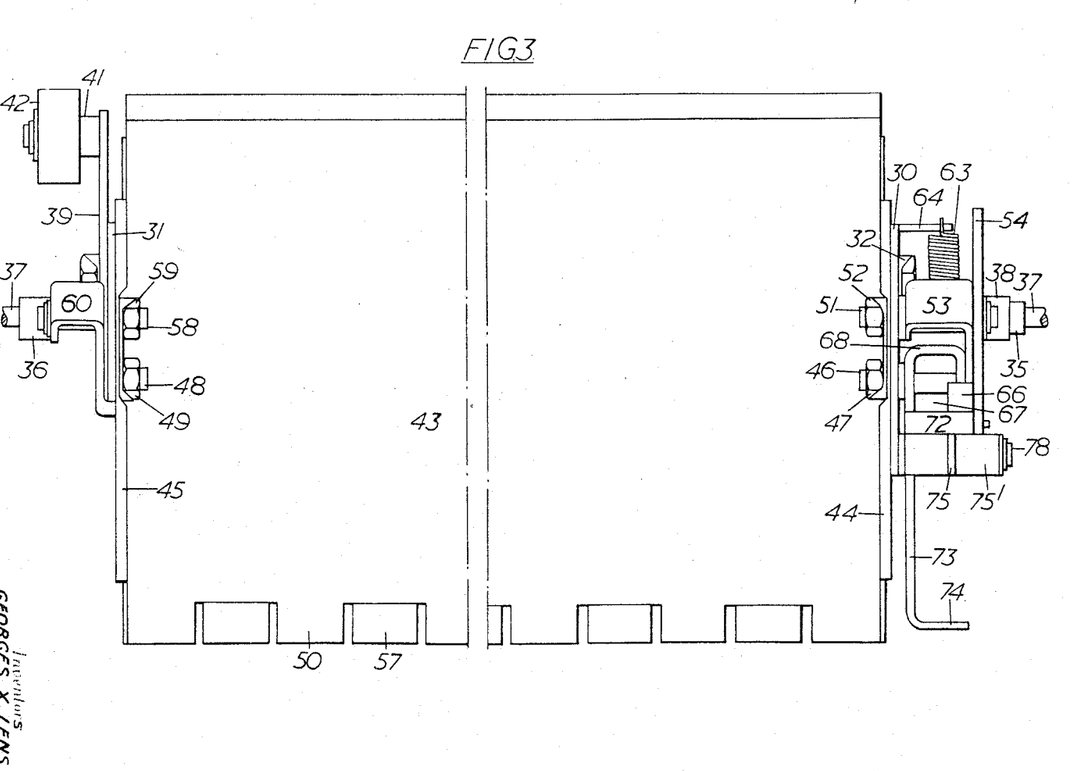
FIG. 3 is a front view of the letter holder of FIG. 2.

Principally referring to FIG. 1, the present transporting device comprises an endless main conveyor constituted by a pair of parallel endless chains, such as 1, which are each driven by gear wheels such as 2 to 8, in a serpentine fashion so as to present five straight horizontal portions 9 to 13, a straight vertical portion 14, a straight inclined portion 15, and five curved portions 16 to 20. A plurality of double-compartment letter holders, such as 21, are arranged between the above pair of endless chains and each of these letter holders is provided with control means for opening the bottom of the letter holder as will be described later. Below the straight horizontal portions are arranged a plurality of letter bins, each series of bins forming a unit indicated by 22. A control electromagnet (not shown) is associated to each of these bins. Two transfer mechanisms (not shown) of the above mentioned type are provided, these mechanisms terminate at the positions $OP_1$ and $OP_2$ located above the straight horizontal portion 9 of the main conveyor.

The transporting device is constituted by six parts I to VI delimited by the schematically represented mountings 23 to 29 of the frame supporting the gear wheels 2 to 8 and the associated driving means. Four of these parts, namely, I, II, III and VI are different, whereas the parts IV and V are identical. When it is required to make one or more operator controlled transfer mechanisms co-operate with the transporting device, it is sufficient to provide a corresponding number of parts II between the parts I and III.

Referring to the FIGS. 2 to 5, each double-compartment letter holder 21 is constituted by two parallel side plates 30 and 31 which are interconnected with the help of the screws 32 and 33 to a bracket (not shown) to which a V-shaped plate 34 is welded. The side plates 30 and 31 are integral with the tubular extensions 35 and 36 respectively, an axle 37 extending between both these side plates 30 and 31 and being rigidly secured in these tubular extensions 35 and 36. A rubber roll 38 is fixed on the tubular extension 35. A bracket 39 and a small plate 40 are secured to the side plate 31 by means of the above screws 33, this bracket 39 carrying an axle 41 on which is mounted a freely rotatable roller 42.

The double-compartment letter holder further comprises two series of identical parts and therefore only one of these series is described in detail hereinafter, homologous pieces of the non described series being indicated by the same reference numerals as in the described series, however provided with an accent.

A plate 43 provided with perpendicularly upturned side edges 44 and 45 is connected to the side plates 30 and 31 by means of the screws and nuts 46, 47 and 48, 49 respectively. The plate 43 is further provided with rectangular indentations 50 at its lower part. A pivot axle 51 is screwed and fixed on the side plate 30 by means of the nut 52 and about this pivot axle 51 the pieces 53 and 54 which are welded together are able to rotate. The piece 53 has a part 55 which is parallel to the above axle 37 and to which is fixed, in a not shown manner, a plate 56 provided with indentations 57.

A pivot axle 58 is screwed and fixed on the side plate 31 by means of the nut 59. The lever arm 60 is able to pivot about this pivot axle 58 and the above plate 56 is fixed to this lever arm 60 by means of a screw (not shown) and a nut 61.

The piece 54 has an extension 62 which is connected to the extension 64 of the side plate 30 by means of the spring 63. The piece 54 further has an extension 65 and an extension 66 which is perpendicular to the plane of the piece 54. A pivot 67 is secured to the side plate 30 and about this pivot 67 a lever 68 is able to rotate. This lever has three arms 69, 71 and 73 each provided with an extension which is perpendicular to the arm, namely 70, 72 and 74 respectively. Below the extensions 70 and 72 is mounted the lever arm 75 which has an abutment 76 and a bent part 77 parallel to the longitudinal axis of the lever arm 75. This lever arm 75 is able to pivot about the pivot 78 secured to the side plate 30 and is urged upwardly by means of the spring 79.

In the position of the letter holder shown, the extension 66 of the piece 54 abuts against the bent part 77 of the lever arm 75. The spring 63 is tensioned and the indentations 57 of the plate 56 match between the indentations 50 of the plate 43. In an analogous manner the extension 66' of the piece 54' abuts against the bent part 77' of the lever arm 75'. The spring 63' is tensioned and the indentations of the plate 56' match between the indentations 50' of the plate 43'. Hence the bottoms of the compartments of the letter holder delimited by the parts 30, 31, 34, 43, 56 and 30, 31, 34, 43', 56' respectively are in the closed position.

In order to open the bottom of a compartment, e.g. of the compartment 30, 31, 34, 43, 56, the lever 68 has to be pivoted in the clockwise or anti-clockwise direction. This happens when the extension 74 of the lever 68 abuts against the armature of the operated control electromagnet associated to a letter bin above which the letter holder travels from right to left or from left to right (FIG. 4) respectively.

When the lever 68 is pivoted in the clockwise or anti-clockwise direction (FIG. 4) the extension 70 or 72 of the lever arm 71 pushes the lever arm 75 in the anti-clockwise direction so as to move the bent part 77 out of engagement from the extension 66 of the piece 54 which is thus urged in the anti-clockwise direction by the restoring spring 63 till its extension 65 abuts against the rubber roll 38. Simultaneously the piece 53 is also rotated in the anti-clockwise direction so that the plate 56 is moved out of engagement from the plate 43 and that the bottom of the compartment considered is opened.

Figure 4:
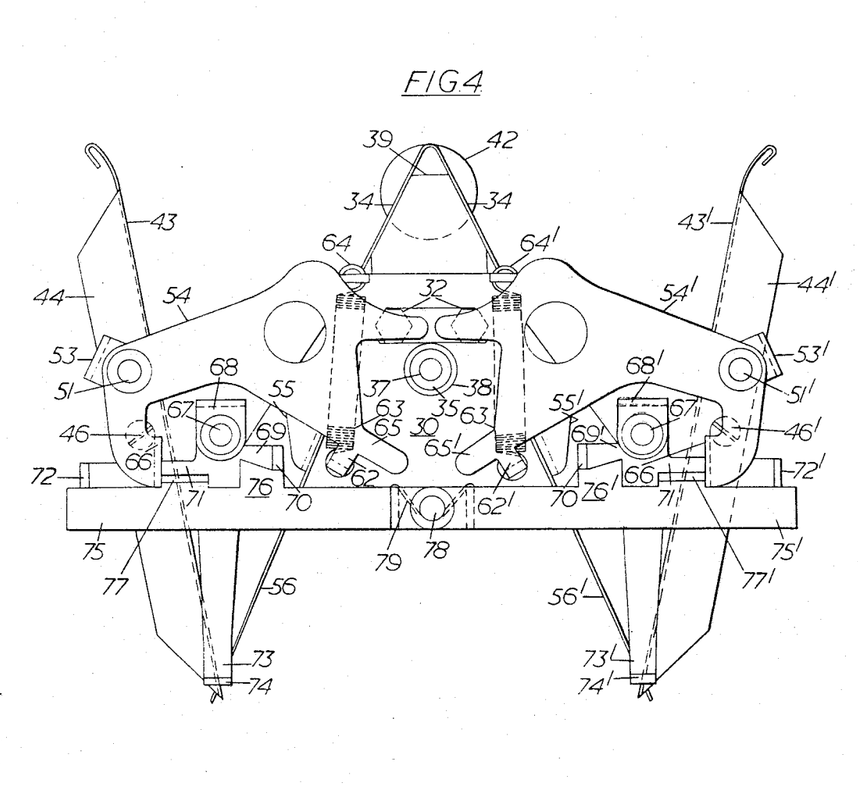
FIG. 4 is a side view of the right hand part of the letter holder shown in FIG. 2.
Figure 5:
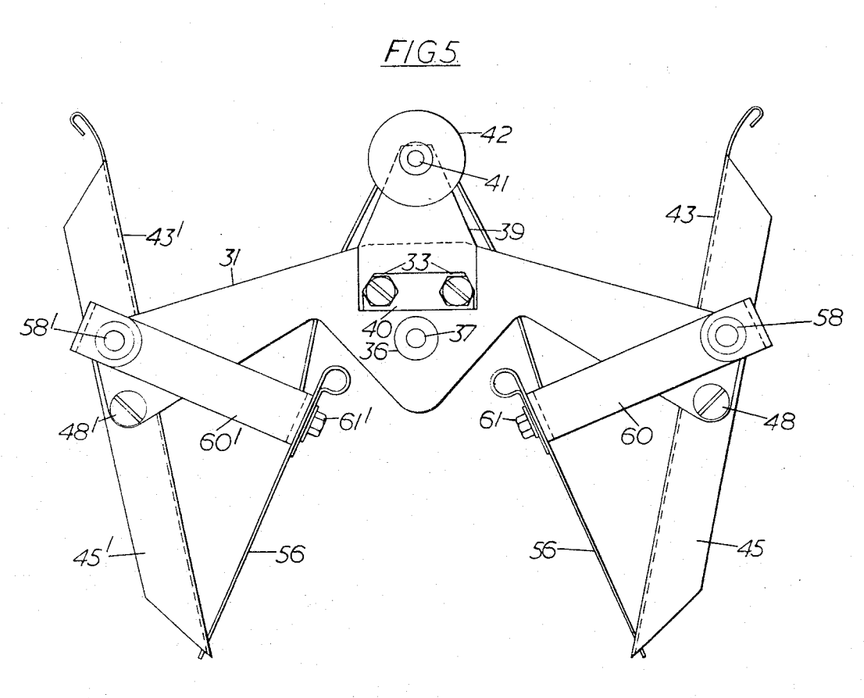
FIG. 5 is a side view of the left hand part of the letter holder shown in FIG. 2.

Thus the letter enclosed in this compartment drops in a letter bin.

In order to close the bottoms of the compartments of the letter holders which have previously been opened, a cam (not shown) has been mounted in the position B above the upper straight portion 18 of the main conveyor. When the bottom of a compartment of a letter holder is in its rest position, the upper part of the piece 57 or 54 will not come into contact with this cam when travelling below it. On the contrary when this piece has previously been pivoted in a direction so as to open the bottom of the compartment, the cam will pivot it back into its rest position.

Principally referring to FIGS. 6 to 9 the parallel chains such as 1 of the endless conveyor are connected to and supported by a plurality of rollers such as 80 which are secured to the conveyor chain between each pair of links thereof. At regular intervals double-compartment letter holders, such as 21, are arranged between these chains, the axle 37 of each of these letter holders extending through two opposite rollers 80. The end of the axle 37 protruding beyond the side plate 30 of the letter holder 21 is secured to one end of a link 81 to the other end of which is fixed a pivot axle 82 about which two rollers 83 and 84 are able to pivot. The rollers 80 and 83 are supported along the horizontal parts 9 to 13 (FIG. 1) of their travel by the lower guide plate 85, while the roller 84 is supported along the same straight horizontal parts by the upper guide plate 86 which is parallel to the guide plate 85.

Figure 6:
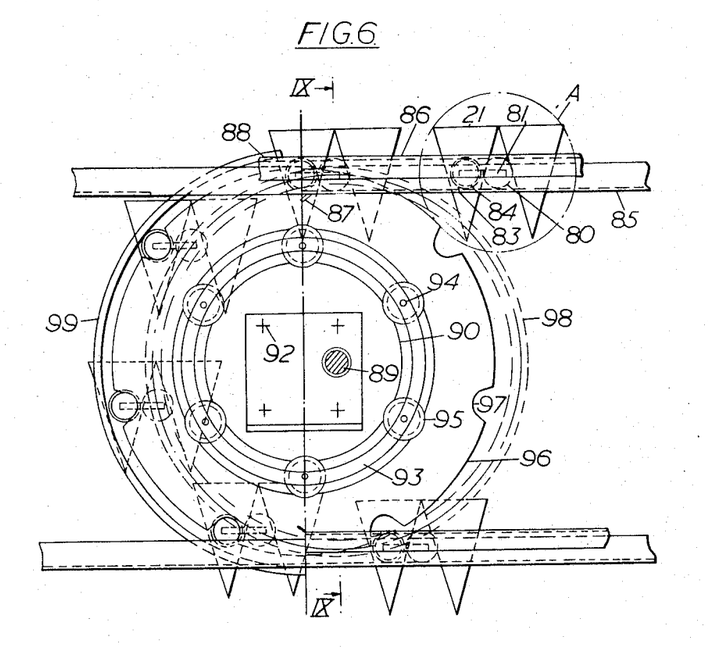
FIG. 6 is a view of a part of the guiding means used in the present transporting device.
Figure 7:
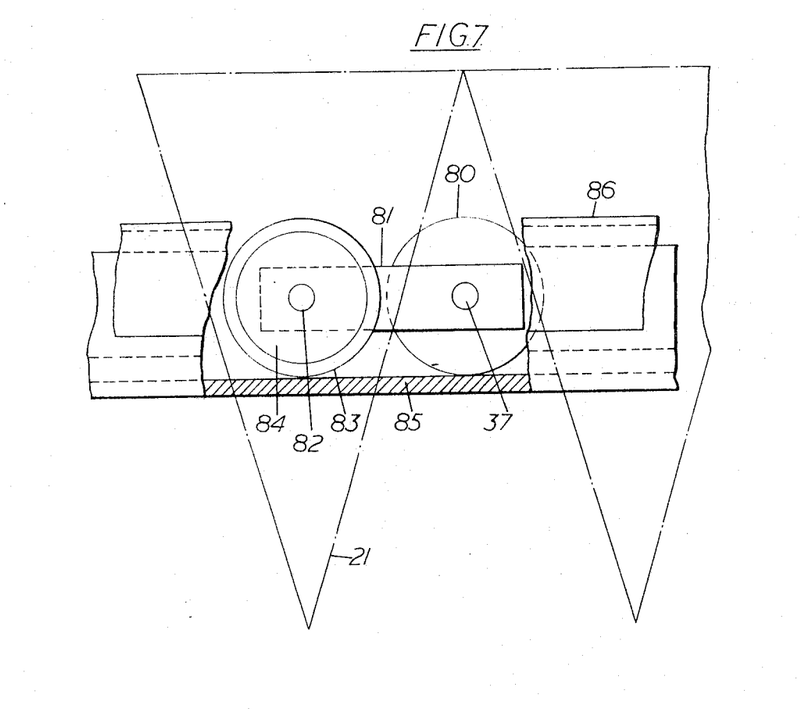
FIG. 7 is a detailed view on a larger scale of the part indicated by A in FIG. 6, with a part of the guiding means broken away.
Figure 8:
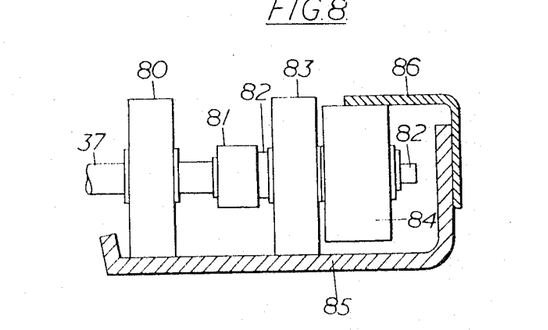
FIG. 8 is a view of FIG. 7 looking from the left to the right.

The part of the guide plate 85 which guides the roller 83 terminates as indicated at 87, whereas the other part of the guide plate 85 is fixed to the mounting 29 (FIG. 1). The guide plate 86 terminates at 88.

Figures 9, 10:
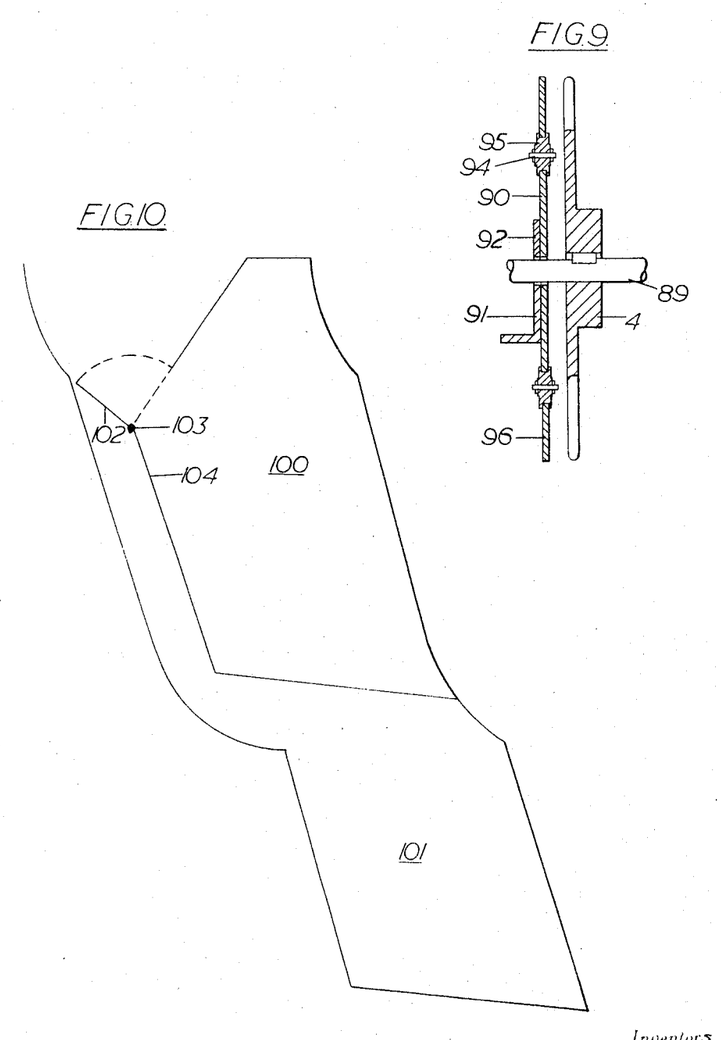
FIG. 9 is a cross-section, on an enlarged scale, along line IX—IX of FIG. 6 with a number of parts removed.
FIG. 10 is a schematic view of a letter bin according to the invention.

In the circular parts 16 to 20 (FIG. 1) of their travel the rollers 80 which form part of the conveyor chains are supported by one of the gear wheels 4 to 8 (FIG. 1), the gear wheel 4 being shown on an enlarged scale in FIG. 9. This gear wheel is keyed to a driving shaft 89 which is supported by a bearing support (not shown) fixed on the frame of the transporting device and able to be horizontally displaced in a direction parallel to the chains. Between this bearing support and gear wheel 4 there is mounted a circular plate 90 which is traversed by the shaft 89 and which is secured to the L-shaped bracket 91, forming part of the above frame, by means of bolts and nuts schematically represented by 92. A metal ring 93 is arranged around the circular plate 90 and constitutes a support for a number of pivots 94 about each of which is freely rotatable a grooved wheel 95 having lateral flanges. Between these flanges are located the peripheral edges of the above circular plate 90 and a ring-shaped disc 96 which is provided with indentations 97. The way followed by the center of a roller 80 when displaced by the gear wheel 4 is indicated at 98. Parallel to the periphery of the ring-shaped disc 96 is mounted a semi-circular guide plate 99 which constitutes a guide for the roller 83.

It is clear that when the rollers 83 and 84 of a letter holder 21 are displaced along the straight horizontal guide plates 85 and 86 respectively, this letter holder 21 remains vertical due to the link 81 being maintained horizontal. The letter holder 21 also remains vertical when the roller 80 of the chain is displaced by the gear wheel 4 along the circular path 98 due to the fact that the roller 84 is then engaged in an indentation 97 of the ring-shaped disc 96 which is thus displaced. This roller 84 describes a circular path which is such that the link 81 hereby remains horizontal.

The ring-shaped disc 96 is so positioned that a roller 84 is always engaged in an indentation 97 when it leaves the guide plate 86. In principle the guide plate 99 is only necessary to prevent a roller 84 engaged in an indentation 97 from falling out of this indentation 97 and therefore this guide plate 99 must in principle only be mounted in front of the lower part of the guide plate 96. However in order to prevent a letter holder to be disengaged by error out of an indentation 97, the guide plate 99 has been prolonged upwardly.

When one would provide, instead of the rollers 83 and 84 only a single roller having a diameter slightly smaller than the distance between the guide plates 85 and 86, then this roller would be rotated in one sense when it comes into contact with the guide plate 85, whereas it would be rotated in the opposite sense when it comes into contact with the guide plate 86. Such sudden changes of the sense of rotation would considerably increase the friction of the roller on the guide plates and this roller would be worn out prematurely. In the curved parts a second roller would in principle also not be necessary, but due to the fact that the roller 84 is engaged in an indentation 97 and is thus prevented from being rotated, it would be considerably worn out when, during its rotation, it comes in contact with the semi-circular guide plate 99.

The above troubles caused by the use of a single roller are only due to the fact that the guides 85, 86, 99 are constituted by plates, but they are eliminated when these guides are for instance constituted by a series of juxtaposed rollers. Since this solution is however expensive, it is preferred to use the two rollers 83, 84 and the guide plates 85, 86 and 99.

The fixed circular plate 90, the bearing wheels 95 and the ring-shaped disc 96 have been employed because the use of a single freely rotatable disc is impossible due to the fact that the latter must be transversed by the shaft 89. Indeed, the displaceable support supporting the bearings of the shaft 89 must be easily accessible in order to be able to tension these chains when necessary. In order that the semi-circular guide plate 99 should remain parallel to the circular path of the rollers 80, this semi-circular guide plate 99 is rigidly connected to the bearing support. In the vertical part 14 (FIG. 1) of the chain there is provided a vertical guide plate (not shown) for the roller 83 of each letter holder 21. Due to the fact that there must always be a certain play between this vertical guide plate and the roller 83, it is practically impossible to maintain the link 81 horizontal and hence the letter holder 21 vertical. Therefore each letter holder is maintained vertical by means of the roller 42 which is guided between two parallel guide plates (not shown), the distance between these guide plates being slightly larger than the diameter of the roller 42. Since the length of these guide plates is relatively small the roller 42 will not be worn out considerably when coming into contact with the one and other of the guide plates, as it is the case when the rollers 83, 84 would be replaced by a single one.

As mentioned above, a plurality of letter bins is mounted under each straight horizontal part 10 to 13 of the conveyor chains. Each such letter bin comprises either a single compartment or is of the type shown in FIG. 10. This bin has two compartments 100 and 101 having inclined side walls and bottom parts so that a letter dropping therein never remains in an upright position. The same entrance opening is used for both the compartments 100 and 101 and a two-position deflector plate 102 is secured to the axle 103 pivoted on top of the side wall 104 separating the two compartments. Control means (not shown) are provided displacing this movable deflector plate 102 in order to open the one and the other of the two compartments 100, 101 when it is in its first and second position respectively. These control means may for instance be constituted by a lever arm which is pivoted in its middle point and which is hingedly connected at one end to a link secured to said axle 102. A first electromagnetic is arranged in closed proximity of the lever arm between said one end thereof and said middle point, whereas a second electromagnet is arranged in close proximity of the lever arm between said middle point and the other end of the lever arm. In this manner the operation of the first or the second electromagnet will pivot the lever arm and hence the axle 102 in the one or the other direction so as to open the compartment 100 and 101 respectively.

In order that the double-compartment letter holders 21 should not come into contact with each other when travelling along the curved portions of the main conveyor, the distance between two adjacent double-compartment letter holders has been chosen in such a manner that the circles of minimum radius wherein their height and width (parallel to the main conveyor) can be described are tangent to each other. The use of double-compartment letter holders is more advantageous than the use of single-compartment letter holders having the same height and width as a compartment of the double-compartment letter holder, since the radius of the circle with minimum radius wherein the height and width of a double-compartment letter holder can be inscribed is smaller than two times the radius of the circle with minimum radius wherein the height and width of a single compartment letter holder can be inscribed. Thus more double-compartment letter holders than single-compartment letter holders can be arranged along a same length of the main conveyor.

While the principles of the invention have been described above in connection with specific apparatus, it is to be clearly understood that this description is made by way of example and not as a limitation on the scope of the invention.

What is claimed is:

1. Transporting device for letters and similar flat objects, more particularly for a letter sorting machine, said transporting device comprising an endless conveyor which is constituted by a pair of parallel endless belts or chains having at least one straight portion and at least one curved portion, a plurality of letter holders being arranged between said pair of parallel endless belts or chains and being each secured thereto by a shaft which is rotatably mounted in two opposite points of said belts or chains, a lever arm being rigidly secured at one end to one end of said shaft and being guided at its other end by guiding means mounted in a plane parallel to the planes of said endless chains or belts and ensuring that the associated letter holder maintains its position in space, characterized in that said guiding means include a first straight guide (86) and a second straight guide (85) which are parallel to said straight portion of said pair of chains or belts, that said lever arm carries at said other end roller means which are freely rotatable about an axle (82) parallel to said shaft (37) and which are guided between said first and second straight guides and that said guiding means further include a curved guide (99) and a freely rotatable element having indentations (97) in one of which said roller means are engaged when they leave said straight portion, said curved guide preventing said roller means to be disengaged out of an indentation while being carried by said rotatable element.

2. Transporting device as claimed in claim 1, characterized in that said first and second straight guides are constituted by straight plates while said curved guide is constituted by a curved plate, and that said roller means include first (84) and second (83) concentric rollers, said first roller being able to be engaged in one of said indentations and making contact with said first straight guide plate only and said second roller making contact with said second guide plate and with said curved plate.

3. Transporting device as claimed in claim 2, characterized in that said endless conveyor is connected to third rollers (80) which are supported by said second straight guide plate.

4. Transporting device as claimed in claim 1, characterized in that said endless conveyor has at least one straight vertical or substantially vertical portion and that each of said letter holders is provided with a guide roller (42) which is guided between two parallel guides which are parallel to said straight vertical or substantially vertical portion.

5. Transporting device as claimed in claim 1, characterized in that said freely rotatable element is constituted by a ring-shape disc (96) the periphery of which is parallel to said curved guide, said ring-shaped disc being supported by circularly arranged bearings themselves supported by a fixed circular disc (90) traversed by the driving shaft (89) forming part of the driving means of said endless conveyor.

6. Transporting device as claimed in claim 5, characterized in that said bearings are constituted by a plurality of freely rotatable grooved rollers (95) having flanges between which the peripheral edges of said ring-shaped disc and of said fixed circular disc are engaged, said grooved rollers being freely rotatable about axles (94) carried by a ring-shaped support (93).

7. Transporting device as claimed in claim 6, characterized in that said driving shaft is secured to a gear wheel (4) and is supported by a displaceable bearing support, that said fixed circular part is located between said bearing support and said gear wheel and that said bearing support is rigidly secured to said curved guide.

8. Holder for letters and similar flat objects, arranged to be mounted on a conveyor displaceable along tripping means adapted when operated to cause the opening of the bottom of a passing holder, characterized in that it comprises at least one compartment the bottom of which may be opened when said holder is displaced along said tripping means in the one and other direction, wherein, each said compartment comprises two side walls (43, 56) which are spaced at their top and which are in contact at their bottom so as to form said bottom of said compartment, at least one of said side walls being pivotable about a pivot axle (51) and urged towards its open position by a spring (63) but normally prevented from doing so by a movable abutment (77), and control means to move said abutment, said control means being operable by said tripping means to move said abutment out of engagement from said one side wall which latter is then urged towards its open position by said spring; said control means comprising a first pivoted lever (75) and a substantially T-shaped second pivoted lever (68), wherein said first pivoted lever carries said abutment and is urged in a position so as to prevent the displacement of the movable side wall by a second spring and that said T-shaped second lever is mounted with one of its arms (69, 71) substantially parallel to and above said first pivoted lever and with its other arm (73) in the way of said tripping means.

References Cited by the Examiner

UNITED STATES PATENTS

| | | |
|---|---|---|
| 702,894 | 6/1902 | Webster _____________ 198—143 |
| 750,886 | 2/1904 | Notter _____________ 198—143 X |
| 1,431,667 | 10/1922 | Johnson. |
| 1,774,447 | 8/1930 | Marchand ___________ 214—11 |
| 2,052,513 | 8/1936 | Kimball. |
| 2,764,275 | 9/1956 | Lens ________________ 198—143 |
| 2,886,166 | 5/1959 | Lens ________________ 198—143 X |

MARVIN A. CHAMPION, *Primary Examiner.*